(12) United States Patent
Gaschler

(10) Patent No.: US 7,196,150 B2
(45) Date of Patent: Mar. 27, 2007

(54) METHOD FOR RADICAL POLYMERISATION IN THE PRESENCE OF A CHAIN TRANSFER AGENT

(75) Inventor: Wolfgang Gaschler, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/534,388

(22) PCT Filed: Dec. 1, 2003

(86) PCT No.: PCT/EP03/13489

§ 371 (c)(1),
(2), (4) Date: May 9, 2005

(87) PCT Pub. No.: WO2004/050717

PCT Pub. Date: Jun. 17, 2004

(65) Prior Publication Data

US 2006/0058478 A1   Mar. 16, 2006

(30) Foreign Application Priority Data

Dec. 3, 2002  (DE) ................ 102 56 617

(51) Int. Cl.
    *C08F 4/04*    (2006.01)
(52) U.S. Cl. ............... 526/218.1; 526/303.1; 526/371.1; 526/319; 526/346
(58) Field of Classification Search ......... 526/218.1, 526/303.1, 319, 346, 317.1
See application file for complete search history.

(56) References Cited

U.S. PATENT DOCUMENTS 5,408,023 A    4/1995  Priddy et al.
2004/0249057 A1  12/2004 Manders

FOREIGN PATENT DOCUMENTS

| DE | 195 12 999 | 10/1995 |
|---|---|---|
| DE | 101 48 497 | 4/2003 |
| EP | 0 036 136 | 9/1981 |
| EP | 0 407 059 | 1/1991 |
| EP | 0 496 925 | 8/1992 |
| JP | 07090012 A * | 4/1995 |
| WO | 98/16563 | 4/1998 |
| WO | 00/63256 | 10/2000 |

OTHER PUBLICATIONS

Baguley et al. "Reductive free-radical alkylation and cyclisation mediated by 1-alkylcyclohexa-2,5-diene-1-carboxylic acids", School of Chemistry, University of St.Andrews, KY16 9ST, UK Journal of the Chemiical Society, Perkin Transaction 1: Organic and Bio-Organic Chemistry, 1998, 13, 2073-2082.*

* cited by examiner

*Primary Examiner*—Ling-Sui Choi
*Assistant Examiner*—M. Bernshteyn
(74) *Attorney, Agent, or Firm*—Oblon, Spivak, McClelland, Maier & Neustadt, P.C.

(57) ABSTRACT

Process for free-radical polymerization in the presence of a regulator which, following free-radical H-abstraction to form an aromatic system, eliminates a free-radical leaving group which starts a new free-radical chain.

11 Claims, No Drawings

METHOD FOR RADICAL POLYMERISATION IN THE PRESENCE OF A CHAIN TRANSFER AGENT

The present invention relates to a process for free-radical polymerization in the presence of a regulator.

For the purposes of this specification, polymers refer to homopolymers and copolymers, and the term polymerizations likewise includes homopolymerizations and copolymerizations.

In polymerization reactions use is often made of regulator substances which effect termination of the chain reaction and thereby control the degree of polymerization or the average molecular weight of the polymer. In addition, they serve to avoid branching and thus to reduce the formation of insoluble gel fractions.

The literature proposes a very wide variety of substances as regulators. Of commercial importance in this connection are compounds with this groups, in particular alkyl mercaptans, such as n- and tert-dodecyl mercaptan (see e.g. Ullmanns Encyclopedia of Industrial Chemistry, 5th ed. on CD-ROM, Synthetic Rubber 2.1.2). However, these substances are disadvantageous from various points of view, for example, due to their unpleasant odor, and they are difficult to handle both before and also during the polymerization. Also disadvantageous is their effect on the intrinsic odor of the polymer. This cannot be completely suppressed even by means of complex deodorizing measures. These regulators are often also irritative to skin and mucosa, which limits their application in polymerization reactions for the preparation of polymers for cosmetics.

Occasionally, other regulators e.g. for the emulsion polymerization of styrene with butadiene have been proposed. For example, in DE-A 19 512 999 sulfur-containing regulators in combination with hydrocarbons such as α-methyl-styrene dimer and terpinolene are used as regulators.

EP-A 407 059 discloses a process for the emulsion polymerization of monomer mixtures containing styrene and butadiene, in which mixtures of terpinolene in combination with other chain-transfer agents are used.

The earlier German application with the file reference 10148497.6 describes a process in which terpinolene and other hydrocarbons which form a pentadienyl radical or a phenylallyl radical with abstraction of a hydrogen atom as chain-transfer agent, and also the a-methylstyrene dimer on its own can be used as regulators.

EP-A 036 136 teaches the use of enol ethers as molecular weight regulators for the preparation of copolymers of styrene and/or derivatives thereof.

As well as the above mentioned other regulators, EP-A 496 925 describes, for example, halogenated solvents, such as chloroform, which have, like mercaptans, an intensive odor and are toxicologically unacceptable.

The regulator systems cited in the prior art, such as mercaptans, have a wide variety of disadvantages. Some of them are odor-intensive, irritative to skin and mucosa, and toxicologically unacceptable. Terpinolene used as regulator forms a delocalized or secondary free radical which has a rate-reducing effect on the course of the reaction.

It is an object of the present invention to develop a process for free-radical polymerization using a regulator system which does not have the disadvantages of the regulator systems used to date.

It was also an aim to be able to use this new type of process in all polymerization reactions which are initiated by free radicals.

We have found that this object is achieved by a process for free-radical polymerization in the presence of a regulator in which the regulators used are carbocyclic or heterocyclic compounds which contain a leaving group in the allyl or heteroallyl position, or homoallyl or homoheteroallyl position, respectively, and which, following free-radical H abstraction, form an aromatic system with elimination of a free-radical leaving group.

In addition, we have found a regulator system which does not have the disadvantages of the regulator systems specified in the prior art, which is advantageous in particular for use in polymerization reactions for the preparation of polymers for cosmetics.

The particular advantage of the carbocyclic or heterocyclic regulator systems used according to the invention is that, with formation of an aromatic system, a leaving group is eliminated which starts a new free-radical chain. This leaving group is in the allyl or heteroallyl position, or homoallyl or homoheteroallyl position, respectively, meaning that, following H abstraction, an aromatic ring system is formed which represents an additional driving force for the progress of the reaction.

Preferably, 5- or 6-membered optionally substituted aromatics or heteroaromatics form as the aromatic system.

Particularly preferably, 5- or 6-membered optionally substituted aromatics or heteroaromatics which contain not more than two heteroatoms in the ring system are formed.

Very particularly preferably, optionally substituted phenyls, pyridines, pyridazines, pyrimidines, pyrazines, pyrans, thiopyrans, pyrroles, pyrazoles, imidazoles, furans, oxazoles, isoxazoles, thiophenes, thiazoles or isothiazoles are formed.

Preferred leaving groups are carboxylate, silyl, sulfonyl, aryl, benzyl, allyl or alkyl groups.

As regulators, preference is given to using compounds of the formulae (I), (II), (III) or (IV):

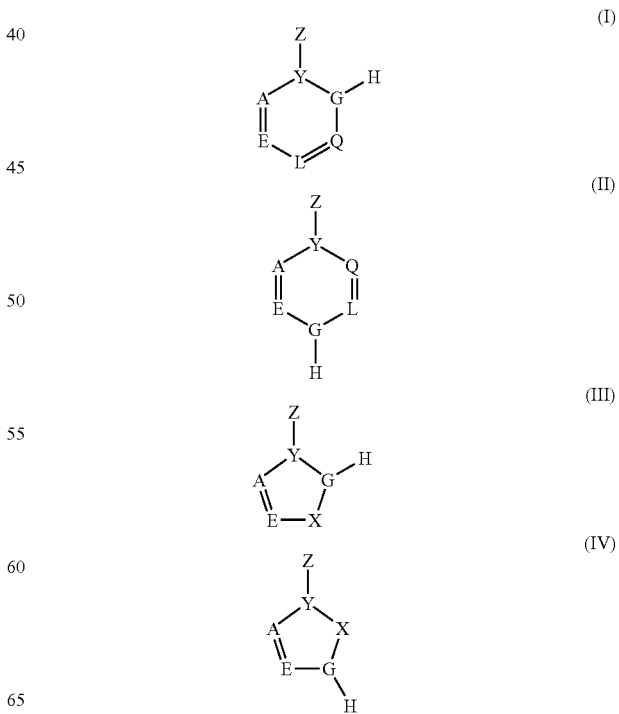

A can be either C—$R^1$ or nitrogen, E can be either C—$R^2$ or nitrogen, L can be either C—$R^3$ or nitrogen and Q can be either C—$R^4$ or nitrogen.

The radicals $R^1$, $R^2$, $R^3$, $R^4$ can, independently of one another, be, for example, hydrogen, $C_1$–$C_{10}$-alkyl, $C_1$–$C_{10}$-alkoxy, $C_1$–$C_{10}$-alkylamino, $C_2$–$C_{20}$-dialkylamino, $C_1$–$C_{10}$-alkylcarbonyl, $C_1$–$C_{10}$-alkylsulfonyl, $C_2$–$C_{10}$-alkenyl or $C_2$–$C_{10}$-alkynyl, in which $R^1$ and $R^2$, $R^2$ and $R^3$ or $R^3$ and $R^4$ can also be joined together and thus together can form a three- to eight-membered, preferably a five- to seven-membered and particularly preferably a five- to six-membered ring.

G can be either C—$R^5$ or nitrogen.

The radical $R^5$ can, for example, be hydrogen or $C_1$–$C_{10}$-alkyl.

X can be a heteroatom, such as, for example, oxygen, sulfur or substituted nitrogen N—$R^6$.

The radical $R^6$ can, for example, be hydrogen, $C_1$–$C_{10}$-alkoxy, $C_1$–$C_{10}$-alkylamino, $C_2$–$C_{20}$-dialkylamino, $C_1$–$C_{10}$-alkylcarbonyl, $C_1$–$C_{10}$-alkylsulfonyl.

Y can be C—$R^7$ or nitrogen.

The radical R∂can, for example, be hydrogen, carboxyl, $C_1$–$C_{10}$-alkyl, $C_1$–$C_{10}$-alkoxy, $C_1$–$C_{10}$-alkylcarbonyl, $C_1$–$C_{10}$-alkoxycarbonyl, $C_1$–$C_{10}$-alkylaminocarbonyl, $C_2$–$C_{20}$-dialkylaminocarbonyl, $C_1$–$C_{10}$-alkylcarbonyloxy, $C_1$–$C_{10}$-alkylcarbonylamino, $C_1$–$C_{10}$-alkylsulfonyl, $C_1$–$C_{10}$-alkoxysulfonyl, $C_1$–$C_{10}$-alkylaminosulfonyl, $C_2$–$C_{20}$-dialkylaminosulfonyl, $C_1$–$C_{10}$-acyl, $C_2$–$C_{10}$-alkenyl, $C_3$–$C_{10}$-alkenyloxy, $C_2$–$C_{10}$-alkenylcarbonyl, $C_3$–$C_{10}$-alkenyloxycarbonyl, $C_3$–$C_{10}$-alkenylaminocarbonyl, $C_2$–$C_{10}$-alkenylcarbonyloxy, $C_2$–$C_{10}$-alkenylcarbonylamino, $C_2$–$C_{10}$-alkenylsulfonyl, $C_3$–$C_{10}$-alkenyloxysulfonyl, $C_3$–$C_{10}$-alkenylaminosulfonyl, $C_2$–$C_{10}$-alkynyl, $C_3$–$C_{10}$-alkynyloxy, $C_2$–$C_{10}$-alkynylcarbonyl, $C_3$–$C_{10}$-alkynyloxycarbonyl, $C_3$–$C_{10}$-alkynylaminocarbonyl, $C_2$–$C_{10}$-alkynylcarbonyloxy, $C_2$–$C_{10}$-alkynylcarbonylamino, $C_2$–$C_{10}$-alkynylsulfonyl, $C_3$–$C_{10}$-alkynyloxysulfonyl, $C_3$–$C_{10}$-alkynylaminosulfonyl, $C_3$–$C_{12}$-cycloalkyl, $C_3$–$C_{12}$-cycloalkoxy, $C_3$–$C_{12}$-cycloalkylcarbonyl, $C_3$–$C_{12}$-cycloalkoxycarbonyl, $C_3$–$C_{12}$-cycloalkylaminocarbonyl, $C_3$–$C_{12}$-cycloalkylcarbonyloxy, $C_3$–$C_{12}$-cycloalkylcarbonylamino, $C_3$–$C_{12}$-cycloalkylsulfonyl, $C_3$–$C_{12}$-cycloalkoxysulfonyl, $C_3$–$C_{12}$-cycloalkylaminosulfonyl, aryl, aryloxy, arylcarbonyl, aryloxycarbonyl, arylaminocarbonyl, arylcarbonyloxy, arylcarbonylamino, arylsulfonyl, aryloxysulfonyl or arylaminosulfonyl.

Z is a carboxylate group $COOR^8$, where $R^8$ is $C_1$–$C_{10}$-alkyl, preferably $C_1$–$C_4$-alkyl; a silyl group $SiR^9R^{10}R^{11}$, where $R^9$–$R^{11}$ independently of one another are hydrogen or $C_1$–$C_{10}$-alkyl, in particular hydrogen or $C_1$–$C_4$-alkyl, and optionally two of the radicals $R^9$–$R^{11}$ may be joined together to give a three- to eight-membered, preferably a five- to seven-membered and particularly preferably a five- or six-membered ring; a sulfonyl group $SO_2R^{12}$, where $R^{12}$ is hydrogen or $C_1$–$C_{10}$-alkyl, preferably hydrogen or $C_1$–$C_4$-alkyl, an aryl group, an optionally substituted benzyl group, an allyl group $C_3$–$C_{10}$-2-alken-1-yl or an alkyl group $R^{13}$ with 1 to 10 carbon atoms, preferably with 1 to 4 carbon atoms. Examples of leaving groups which may be mentioned are $COOCH_3$, $COOC_2H_5$, trialkylsilyl such as trimethylsilyl, sulfonyl such as methylsulfonyl, phenyl, benzyl, allyl such as 2-propen-1-yl, or alkyl such as methyl, ethyl, propyl, isopropyl, butyl, sec-butyl or tert-butyl.

Specifically, the collective terms given for the various radicals R are the following:

$C_1$–$C_{10}$-Alkyl: straight-chain or branched hydrocarbon radicals having up to 10 carbon atoms, e.g. $C_1$–$C_6$-alkyl, such as methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl.

These alkyl radicals listed by way of example are likewise preferred if they are bonded to the ring as part of a functional group, i.e. in the case of alkoxy, alkyl- or dialkylamino, alkyl- or alkoxycarbonyl, alkylamino- or dialkylaminocarbonyl, alkylcarbonyloxy, alkylcarbonylamino, alkyl- or alkoxysulfonyl, alkylamino- or dialkylaminosulfonyl or acyl.

$C_2$–$C_{10}$-Alkenyl: unsaturated, straight-chain or branched hydrocarbon radicals having 2 to 10 carbon atoms and a double bond in any position, e.g. $C_2$–$C_6$-alkenyl, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-i-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl- 2,3-dimethyl-2-butenyl, 2,3-dimethyl-3-butenyl, 3,3-dimethyl-1-butenyl, 3,3-dimethyl-2-buteny 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl.

These alkenyl radicals listed by way of example are likewise preferred if they are bonded to the ring as part of a functional group, i.e. in the case of alkenyloxy, where the double bond is in any position nonadjacent to the heteroatom, alkenyl- or alkenyloxycarbonyl, alkenylaminocarbonyl, alkenylcarbonyloxy, alkenylcarbonylamino, alkenylsulfonyl, alkenyloxysulfonyl or alkenylaminosulfonyl.

$C_2$–$C_{10}$-Alkynyl: straight-chain or branched hydrocarbon groups having 2 to 10 carbon atoms and a triple bond in any position, e.g. ethynyl or $C_3$–$C_6$-alkynyl, such as 1-propynyl, 2-propynyl, 1-butynyl, 2-butynyl, 3-butynyl, 1-methyl-2-propynyl, 1-pentynyl, 2-pentynyl, 3-pentynyl, 4-pentynyl, 1-methyl-2-butynyl, 1-methyl-3-butynyl, 2-methyl-3-butynyl, 3-methyl-1-butynyl, 1,1-dimethyl-2-propynyl, 1-ethyl-2-propynyl, 1-hexynyl, 2-hexynyl, 3-hexynyl, 4-hexynyl, 5-hexynyl, 1-methyl-2-pentynyl, 1-methyl-3-pentynyl, 1-methyl-4-pentynyl, 2-methyl-3-pentynyl, 2-methyl-4-pentynyl, 3-methyl-1-pentynyl, 3-methyl-4-pentynyl, 4-methyl-1-pentynyl, 4-methyl-2-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl and 1-ethyl-1-methyl-2-propynyl.

These alkynyl radicals listed by-way of example are likewise preferred if they are bonded to the ring as part of a functional group, i.e. in the case of alkynyloxy with a triple bond in any position nonadjacent to the heteroatom, alkynyl- or alkynyloxycarbonyl, alkynylaminocarbonyl, alkynylcarbonyloxy, alkynylcarbonylamino, alkynylsulfonyl, alkynyloxysulfonyl or alkynylaminosulfonyl.

$C_3$–$C_{12}$-Cycloalkyl: monocyclic saturated hydrocarbon groups having 3 to 12 carbon ring members, e.g. $C_3$–$C_8$-cycloalkyl, such as cyclopropyl, cyclobutyl, cyclopentyl, cyclohexyl, cycloheptyl and cyclooctyl.

These cycloalkyl radicals listed by way of example are likewise preferred if they are bonded to the ring as part of a functional group, i.e. in the case of cycloalkoxy, cycloalkylcarbonyl, cycloalkoxycarbonyl, cycloalkylaminocarbonyl, cycloalkylcarbonyloxy, cycloalkylcarbonylamino, cycloalkylsulfonyl, cycloalkoxysulfonyl or cycloalkylaminosulfonyl.

Aryl: a mono- to trinuclear aromatic ring system containing 6 to 14 carbon ring members, e.g. phenyl, naphthyl and anthracenyl.

Preferred aryl radicals are phenyl radicals which can optionally carry 1 to 3 inert substituents such as, for example, $C_1$–$C_4$-alkyl radicals.

These aryl radicals listed by way of example are likewise preferred if they are bonded to the ring as part of a functional group, i.e. in the case of aryloxy, arylcarbonyl, aryloxycarbonyl, arylaminocarbonyl, arylcarbonyloxy, arylcarbonylamino, arylsulfonyl, aryloxysulfonyl or arylaminosulfonyl.

Preferred radicals $R^1$ to $R^7$ are $C_1$–$C_{10}$-alkyl, $C_1$–$C_{10}$-alkoxy, $C_1$–$C_{10}$-alkylamino, $C_1$–$C_{10}$-alkylcarbonyl, $C_1$–$C_{10}$-acyl, $C_2$–$C_{10}$-alkenyl and $C_2$–$C_{10}$-alkynyl.

Preferred leaving groups Z are carboxylate groups $COOR^8$ with $C_1$–$C_4$-alkyl radicals as $R^8$, silyl groups $SiR^9R^{10}R^{11}$ with, independently of one another, hydrogen or $C_1$–$C_4$-alkyl groups as $R^9$–$R^{11}$, where optionally at least two of the radicals $R^9$–$R^{11}$ may be joined together to give a 3- to 8-membere ring, in particular a 5- or 6-membered ring, sulfonyl groups $SO_2R^{12}$ with hydrogen or $C_1$–$C_4$-alkyl radicals as $R^{12}$, optionally substituted phenyls and benzyls, allyls having 3 to 6 carbon atoms and alkyls having 1 to 4 carbon atoms.

Particularly preferred leaving groups Z are carboxylate groups $COOR^8$ with methyl, ethyl, propyl, isopropyl, butyl, sec-butyl, tert-butyl substituents, silyl groups $SiR^9R^{10}R^{11}$ with, independently of one another, hydrogen or methyl, ethyl, propyl, isopropyl, butyl, sec-butyl or tert-butyl substituted, benzyl, allyls, such as 2-propen-1-yl, and alkyls, such as methyl, ethyl, propyl, isopropyl, butyl, sec-butyl or tert-butyl.

Said radicals and groups can also be optionally substituted and carry one to three, preferably one, of the following radicals: cyano, nitro, hydroxyl, amino, formyl, carboxyl, aminocarbonyl, alkyl, alkoxy, alkylamino, dialkylamino, alkylcarbonyl, alkoxycarbonyl, alkylcarbonyloxy, alkylaminocarbonyl, dialkylaminocarbonyl, alkylcarbonylamino, alkoxycarbonylamino, alkylcarbonyl-N-alkylamino, where the alkyl groups in these radicals have preferably 1 to 6 carbon atoms, in particular 1 to 4 carbon atoms.

Preferred compounds of the formulae (I), (II), (III) and (IV) are 2,5-cyclohexadiene-1-carboxylic acid, 1-isopropyl-2,5-cyclohexadiene-1-carboxylic acid, 1-tert-butyl-2,5-cyclohexadiene-1-carboxylic acid, 1-benzyl-2,5-cyclohexadiene-1-carboxylic acid, 1-allyl-2,5-cyclohexadiene-1-carboxylic acid, 1-cyanomethyl-2,5-cyclohexadiene-1-carboxylic acid, 1-methyl-2,5-cyclohexadiene-1-carboxylic acid and $C_1$–$C_4$-alkyl esters thereof, such as methyl 2,5-cyclohexadiene-1-carboxylate, methyl 1-methyl-2,5-cyclohexadiene-1-carboxylate, 2,4-cyclohexadiene-1-carboxylic acid, 1-methyl-2,4-cyclohexadiene-1-carboxylic acid, methyl 2,4-cyclohexadiene-1-carboxylate and $C_1$–$C_4$-alkyl esters thereof, such as methyl 1-methyl-2,4-cyclohexadiene-1-carboxylate, 2,5-dihydrofuran-2-carboxylic acid, 2-methyl-2,5-dihydrofuran-2-carboxylic acid and $C_1$–$C_4$-alkyl esters thereof, such as methyl 2,5-dihydrofuran-2-carboxylate, methyl 2-methyl-2,5-dihydrofuran-2-carboxylate, 2H-pyridine-1-carboxylic acid, methyl 2H-pyridinecarboxylate, 4H-pyridine-1-carboxylic acid, methyl 4H-pyridinecarboxylate, 2,6-dimethoxy-2,5-cyclohexadiene-1-trimethylsilane, 1-methyl-2,6-dimethoxy-2,5-cyclohexadiene-1-trimethylsilane, 2,6-dimethoxy-2,5-cyclohexadiene-1-tert-butyldimethylsilane, 1-methyl-2,6-dimethoxy-2,5-cyclohexadiene-1-tert-butyidimethylsilane, 2,6-dimethoxy-2,5-cyclohexadiene-1-phenyidimethylsilane, 1-methyl-2,6-dimethoxy-2,5-cyclohexadiene-1-phenyidimethylsilane, 2,6-dimethoxy-2,5-cyclohexadiene-1-triisopropylsilane, 1-methyl-2,6-dimethoxy-2,5-cyclohexadiene-1-triisopropylsilane, 2,5-cyclohexadiene-1-trimethylsilane, 1-methyl-2,5-cyclohexadiene-1-trimethylsilane.

Preferred compounds are those which, following H abstraction and elimination of the group Z, form a phenyl or a furan system, for example 2,5-cyclohexadiene-1-carboxylic acid, 1-methyl-2,5-cyclohexadiene-1-carboxylic acid, 1-isopropyl-2,5-cyclohexadiene-1-carboxylic acid, 1-tert-butyl-2,5-cyclohexadiene-1-carboxylic acid, 1-benzyl-2,5-cyclohexadiene-1-carboxylic acid, 1-allyl-2,5-cyclohexadiene-1-carboxylic acid, 1-cyanomethyl-2,5-cyclohexadiene-1-carboxylic acid, methyl 2,5-cyclohexadiene-1-carboxylate, methyl 1-methyl-2,5cyclohexadiene-1-carboxylate, 2,4-cyclohexadiene-1-carboxylic acid, 1-methyl-2,4-cyclohexadiene-1-carboxylic acid, methyl 2,4-cyclohexadiene-1-carboxylate, methyl 1-methyl-2,4-cyclohexadiene-1-carboxylate, 2,5-dihydrofuran-2-carboxylic acid, 2-methyl-2,5-dihydrofuran-2-carboxylic acid, methyl 2,5-dihydrofuran-2-carboxylate, methyl 2-methyl-2,5-dihydrofuran-2-carboxylate, 2,6-dimethoxy-2,5-cyclohexadiene-1-trimethylsilane, 1-methyl-2,6-dimethoxy-2,5-cyclohexadiene-1-trimethylsilane, 2,6-dimethoxy-2,5-cyclohexadiene-1-tert-butyldimethylsilane, 1-methyl-2,6-dimethoxy-2,5-cyclohexadiene-1-tert-butyidimethylsilane, 2,6-dimethoxy-2,5-cyclohexadiene-1-phenyidimethylsilane, 1-methyl-2,6-dimethoxy-2,5-cyclohexadiene-1-phenyidimethylsilane, 2,6-dimethoxy-2,5-cyclohexadiene-1-triisopropylsilane, 1-methyl-2,6-dimethoxy-2,5-cyclohexadiene-1-triisopropylsilane, 2,5-cyclohexadiene-1-trimethylsilane and 1-methyl-2,5-cyclohexadiene-1-trimethylsilane.

Very particular preference is given to methyl 1-methyl-2,5-cyclohexadiene-1-carboxylate, 1-isopropyl-2,5-cyclohexadiene-1-carboxylic acid, 1-tert-butyl-2,5-cyclohexadiene-1-carboxylic acid, 1-benzyl-2,5-cyclohexadiene-1-carboxylic acid, 1-allyl-2,5-cyclohexadiene-1-carboxylic acid and/or 1-cyanomethyl-2,5-cyclohexadiene-1-carboxylic acid.

Said compounds of the formulae (I) to (IV) in which Z contains a carboxylate group are synthesized analogously to processes known from the literature.

Walton et al. describes, inter alia, in J. Chem. Soc., Perkin Trans. 2, 1997, pages 757–762, starting from benzoic acid or furan-2-carboxylic acid, the synthesis of a number of 2,5-cyclohexadiene-1-carboxylic acid derivatives or 2,5-dihydrofuran-2-carboxylic acid derivatives, respectively. These are obtained via a Birch reduction with subsequent alkylation with an alkyl halide and optional esterification of the acid group.

In J. Chem. Soc., Perkin Trans. 2, 1998, pages 1423–1429, Walton et al. teaches the synthesis of a number of 2H- or 4H-pyridine-1-carboxylic acid derivatives by reacting pyridine with sodium borohydride and optionally derivatized carbonyl dichloride.

Likewise, said compounds of the formulae (I) to (IV) in which Z contains a trialkylsilyl group can be prepared analogously to processes known from the literature (cf. e.g. Angew. Chem., Int. Ed. 2000, Volume 29, Vol. 17, pages 3080–3082).

The compounds of the formulae (I) to (IV) contain an allylic or heteroallylic or homoallylic or homoheteroallylic hydrogen atom which is abstracted by free-radical means. It may of course also be a bisallylic or bisheteroallylic hydrogen atom. As intermediates, a cyclohexadienyl or a dihydrofuranyl radical, for example, is formed. With elimination of the leaving group, an aromatic system is formed, and a free-radical leaving group arises which starts a new free-radical chain. In the case of the carboxylate group as free-radical leaving group, carbon dioxide escapes and a highly reactive alkyl radical is formed. Such a mechanism is described, for example, in J. Chem. Soc., Chem. Commun. 1995, pages 27–28 by Walton et al.

According to the invention, preferably 0.005 to 6% by weight and in particular preferably 0.01 to 5% by weight, of regulators, based on the total amount of monomers, are used.

Mixtures of two or more of the regulators to be used according to the invention are of course also possible.

In addition, it is also possible to use mixtures of the regulators used according to the invention with regulator systems which are already known. In particular mixtures with organic compounds S with at least one SH group are possible. These compounds S are preferably soluble in the hydrophobic monomers styrene and butadiene. In particular, they are chosen from $C_4$–$C_{18}$-alkyl mercaptans, such as n-hexyl mercaptan, n-octyl mercaptan, tert-octyl mercaptan, n-decyl mercaptan, n-dodecyl mercaptan, tert-dodecyl mercaptan, n-hexyldecyl mercaptan and stearyl mercaptan.

The various regulators can of course be added at the same time, or else at different times.

The choice of the different substituents R permits targeted control of the solution behavior of the regulator system. In emulsion polymerizations, preference is given to using regulators which are hydrophobic, i.e. the radicals R are chosen from said groups such that the overall regulator is only sparingly soluble in an aqueous medium and regulates the polymerization in the latex particle. The introduction of polar substituents gives the regulators a hydrophilic solubility behavior, meaning that these regulators are preferably used for solution polymerizations in water.

It is likewise possible to control the solubility behavior of the regulator system through different mixtures containing the organic compounds S.

According to the invention, the regulator is added continuously over the course of the polymerization reaction. In addition, an initial charge of the regulator in the polymerization vessel is possible.

Preference is given to combining the two processes by initially introducing some of the regulator, which will usually not exceed 20% of the total amount of regulator, into the polymerization vessel, particularly when monomers are also initially introduced into the polymerization vessel. Preferably, the regulator is added in parallel to the monomer, i.e. the majority, in particular at least 80% and particularly preferably the total amount, of the regulator system is added over a period in which the monomers of the polymerization reaction to be polymerized are also introduced. In this connection, it has proven useful in particular if the regulators are introduced into the polymerization reaction together with the monomers. The regulator can of course also be added via a separate feed.

In further embodiments, the metered addition of the regulator takes place over so-called ramps and stages, i.e. in procedures in which the addition of regulator is started later than the monomer feed, or ends earlier than said feed.

According to the invention, it is also possible that the concentration of the regulator system changes during the addition according to said variations. Preference is given to starting with relatively high regulator concentrations which decrease over the course of the polymerization reaction.

The process according to the invention is used in all polymerizations which proceed by a free-radically initiated mechanism. These are explained in more detail below.

Polymerization reactions can proceed by various mechanisms. The difference is in the initiation of the polymerization mechanism; this may be initiated free-radically, anionically, cationically or else coordinatively, i.e. by coordination to transition metal catalysts.

The free-radical polymerization reaction is a chain reaction known to the person skilled in the art which consists essentially of the following steps: chain initiation, chain growth, chain transfer and chain termination. Chain initiation takes place by means of a free-radical initiator or thermally. For the controlled chain termination the regulator substances described hitherto in the prior art are used.

The process according to the invention is used in the controlled chain termination of a free-radical polymerization reaction.

Homopolymers and copolymers for the purposes of the present invention are constructed from free-radically polymerizable compounds (monomers).

Copolymers consist preferably of at least 40% by weight, particularly preferably of at least 60% by weight, very particularly preferably of at least 80% by weight, of so-called main monomers.

The main monomers are chosen from monoethylenically unsaturated $C_3$–$C_6$-carboxylic acids, $C_1$–$C_{20}$-(meth)acrylic esters, amides and nitriles, vinyl esters of carboxylic acids containing up to 20 carbon atoms, vinylaromatics having up to 20 carbon atoms, vinyl halides, vinyl ethers of alcohols containing 1 to 10 carbon atoms, aliphatic optionally halogenated hydrocarbons having 2 to 8 carbon atoms and 1 or 2 double bonds, open-chain N-vinylamide compounds, vinylidenes or mixtures of these monomers.

Preferred monoethylenically unsaturated $C_3$–$C_6$-carboxylic acids are, for example, acrylic acid, methacrylic acid, crotonic acid, fumaric acid, itaconic acid, maleic acid and $C_1$–$C_{20}$-alkyl esters, amides, nitriles and anhydrides thereof, such as, for example, methyl acrylate, ethyl acrylate, methyl methacrylate, ethyl methacrylate, n-butyl acrylate, n-butyl methacrylate, aryl methacrylate, acrylic anhydride, itaconic anhydride, monomethyl maleate, dimethyl maleate, monoethyl maleate, diethyl maleate, 2-ethylhexyl acrylate, 2-ethylhexyl methacrylate, maleic anhydride, and half-ester thereof, alkylene glycol (meth)acrylates, acrylamide, methacrylamide, N-dimethylacrylamide, N-tert-butylacrylamide, acrylonitrile, methacrylonitrile. Cationic monomers of this group are, for example, dialkylaminoalkyl (meth)acrylates and dialkylaminoalkyl(meth)acrylamides, such as dimethylaminomethyl acrylate, diethylaminoethyl acrylate, diethylaminoethyl methacrylate, and the salts of the last-mentioned monomers with carboxylic acids or mineral acids, and the quaternized products.

Further monomers are, for example, monomers also containing hydroxyl groups, in particular $C_1$–$C_{10}$-hydroxyalkyl (meth)acrylates, such as, for example, hydroxyethyl acrylate, hydroxypropyl acrylate, hydroxybutyl acrylate, hydroxyethyl methacrylate, hydroxypropyl methacrylate, hydroxyisobutyl acrylate and hydroxyisobutyl methacrylate.

Further monomers are phenyloxyethyl glycol mono (meth)acrylate, glycidyl acrylate, glycidyl methacrylate, amino(meth)acrylates, such as 2-aminoethyl (meth)acrylate.

In particular, mixtures of (meth)acrylic alkylesters are also suitable.

Vinyl esters of carboxylic acids having 1 to 20 carbon atoms are, for example, vinyl laurate, vinyl stearate, vinyl propionate, vinyl versatate and vinyl acetate.

Suitable vinylaromatic compounds are vinyltoluene, α- and p-methylstyrene, α-butylstyrene, 4-n-butylstyrene, 4-n-decylstyrene, 2-vinylpyridine, N-vinylpyrrolidone and preferably styrene.

The vinyl halides are ethylenically unsaturated compounds substituted by chlorine, fluorine or bromine, preferably vinyl chloride, vinyl fluoride and vinylidene chloride.

Examples of vinyl ethers are methyl vinyl ether, ethyl vinyl ether, butyl vinyl ether, 4-hydroxybutyl vinyl ether, vinyl isobutyl ether or dodecyl vinyl ether. Preference is given to vinyl ethers of alcohols containing 1 to 4 carbon atoms.

Examples of aliphatic optionally halogenated hydrocarbons having 2 to 8 carbon atoms and 1 or 2 olefinic double bonds are ethylene, propene, isoprene, 1-butene, isobutene, butadiene, isoprene (2-methyl-1,3-butadiene) and chloroprene (2-chloro-1,3-butadiene).

It is also possible to use open-chain N-vinylamide compounds, such as, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide.

An example of a vinylidene is vinylidene cyanide.

Further monomers are vinylacetic acid, vinyl carbazole, hydroxymethyl vinyl ketone, vinylene carbonate, tetrafluoroethylene, hexafluoropropene, nitroethylene, allylacetic acid, α-chloroacrylic ester, α-cyanoacrylic ester, methylene malonic ester, α-cyanosorbic ester, cyclopentadiene and cyclopentene.

As well as said main monomers, the polymer can contain further monomers, e.g. ethylenically unsaturated monomers with sulfonic acid or phosphonic acid groups, such as vinylsulfonic acid, allylsulfonic acid, styrenesulfonic acid, 2-acrylamidomethylpropanesulfonic acid or vinylphosphonic acid, allylphosphonic acid, styrenephosphonic acid, 2-acrylamido-2-methylpropanephosphonic acid.

Moreover, all other monomers whose polymerization proceeds by a free-radically initated mechanism are possible, as described, for example, in DE-A 10 041 211 and in the earlier German application with the file reference 10148497.6.

Further monomers which may be mentioned are also crosslinking monomers.

Preferred monomers are styrene, butadiene, acrylic acid, methacrylic acid, $C_1$–$C_{10}$-alkyl esters of acrylic acid and methacrylic acid, N-vinylpyrrolidone and acrylonitrile.

A distinction is made between several types of polymerization which can be initiated, inter alia, by free-radical means.

The process according to the invention is used in free-radical polymerizations of varying types, in particular in emulsion, in microemulsion, in miniemulsion, in suspension, in microsuspension, in minisuspension, in precipitation polymerizations, in bulk or in solution, continuously or discontinuously.

In emulsion polymerization and its variants (microemulsion, miniemulsion), the monomers are emulsified in water, for which purpose emulsifiers are used. The emulsifiers suitable for stabilizing the emulsion are soap-like auxiliaries which surround the monomer droplets and thereby protect them from coalescing.

Suitable emulsifiers are the anionic, cationic or neutral (nonionogenic) emulsifiers known to the person skilled in the art. Anionic emulsifiers are, for example, alkali metal salts of higher fatty acids having 10 to 30 carbon atoms, such as palmitic acid, stearic acid and oleic acid, alkali metal salts of sulfonic acids having, for example, 10 to 16 carbon atoms, in particular sodium salts of alkyl- or alkylarylsulfonic acids, alkali metal salts of half-esters of phthalic acid, and alkali metal salts of resin acids, such as abietic acid. Cationic emulsifiers are, for example, salts of long-chain, in particular unsaturated amines having 12 to 18 carbon atoms, or quaternary ammonium compounds having longer-chain olefin or paraffin radicals (i.e. salts of quaternized fatty amines). Neutral emulsifiers are, for example, ethoxylated fatty alcohols, ethoxylated fatty acids or ethoxylated phenols and fatty acid esters of polyhydric alcohols, such as pentaerythritol or sorbitol.

For emulsion polymerization preference is given to using initiators which are sparingly soluble in the monomer, but readily soluble in water. Preference is therefore given to using peroxosulfates, such as potassium peroxodisulfate, sodium peroxodisulfate or ammonium peroxodisulfate, or else redox systems, in particular those based on hydroperoxides, such as cumene hydroperoxide, dicumene peroxide or hydrogen peroxide.

The initiator(s) can be added before or after the preparation of the emulsion, or only directly prior to the start of the polymerization, or else be metered in continuously over the course of the polymerization.

Particularly in the case of monomers which tend toward uncontrolled polymerization, or even polymerize at the temperature of the emulsion preparation, it is advisable to add the initiator only after the emulsification, in some instances only directly prior to the polymerization.

Particularly in the case of polymerizations with a long polymerization time, it may be advantageous to add the initiator, as a continuous feed or in portions, during the polymerization. In this connection, the initiator feed time can be different from or identical to the polymerization time.

Further additives which can be used in the polymerization are buffer substances, such as $Na_2HPO_4$/$NaH_2PO_4$ or Na citrate/citric acid in order to establish a pH which remains essentially constant. These further additives can be added continuously or discontinuously at the start and/or during the preparation of the emulsion and/or during the polymerization.

The polymerization medium for emulsion polymerizations can consist either only of water, or of mixtures of water and organic liquids miscible therewith, such as methanol, ethanol, n-propanol, isopropanol, n-butanol, tert-butanol, tetrahydrofuran, formamide, dimethylformamide, where the proportion of these liquids, based on the polymerization medium, usually constitutes not more than 10% by weight, in particular not more than 5% by weight and specifically not more than 1% by weight. Preferably, only water is used as polymerization medium.

As well as the seed-free preparation method described above for establishing a defined polymer particle size, the emulsion polymerization of the 1st polymerization stage can take place by the seed latex process or in the presence of in situ prepared seed latex. Processes in this regard are known and can be taken from the prior art (see EP-B 40 419, EP-A 614 922, EP-A 657 812 and literature cited therein, and 'Encyclopedia of Polymer Science and Technology', Vol. 5, John Wiley & Sons Inc., New York 1966, p. 847).

In the seed latex process, the polymerization of the monomers takes place in the presence of 0.001 to 5% by weight and in particular 0.01 to 3% by weight of a seed latex (solids content of the seed latex, based on the total amount of monomer), preferably with an initial charge of seed latex (seed charge). The latex generally has a weight-average particle size of from 10 to 200 nm and in particular 20 to 200 nm. Its constituent monomers are, for example, styrene, methyl methacrylate, n-butyl acrylate and mixtures thereof, where the seed latex may also contain, in copolymerized form and to a secondary degree, further monomers (e.g. acrylic acid), preferably less than 10% by weight, based on the total weight of the polymer particles in the seed latex.

The emulsion polymerization reaction is generally carried out with slow and moderate stirring.

Microemulsion polymerization differs from normal emulsion polymerization primarily inasmuch as an emulsion is prepared from the monomers, water and the emulsifiers by using high shear forces. For this purpose, use is made of homogenizers which are known to the person skilled in the art.

Examples which may be mentioned are:
Dispermat® laboratory dissolver, VMA-Getzmann, Reichshof, Germany,
Ultra-Turax®, Janke and Kunkel, Staufen, Germany,
Pressure homogenizer, Gaulin, Lübeck, Germany,
Devices with a rotor-stator system, for example
    Dispax®, Janke and Kunkel, Staufen, Germany,
    Cavitron homogenizers, Hagen & Funke, Sprockhövel, Germany,
    Homogenizers from Kotthoff, Essen, Germany,
    Homogenizers from Dorr Oliver, Grevenbroich, Germany.

These devices are usually operated at from 1 000 to 25 000 revolutions per minute, preferably from 2 000 to 25 000 revolutions per minute.

In addition, the high shear forces can likewise be generated by
the action of ultrasound,
pressing the mixture of monomers, water and protective colloids or emulsifiers at high pressure through a narrow gap or through nozzles of small diameter
colloid mills or other suitable homogenizers.

Miniemulsion polymerization differs from normal emulsion polymerization and microemulsion polymerization primarily inasmuch as the particle size is usually between 30–500 nm, i.e. is between the typical particle sizes of emulsion and microemulsion polymerization, and the particles are usually stabilized against running together by a combination of ionic emulsifiers and coemulsifiers.

In the case of the miniemulsion, the mixture of monomers, water, emulsifiers and coemulsifiers is subjected to high shear forces, during which the components are intimately mixed. Polymerization is then carried out. The high shear forces can be generated, for example, by ultrasound or by a microfluidizer device, as described for the microemulsion. Details of the miniemulsion will be found by the person skilled in the art in P. Covell, M. El-Asser, Emulsion Polymerization and Emulsion Polymers, Verlag John Wiley, New York, 1997, pp. 699–722.

The coemulsifiers chosen are compounds which ensure that the droplets which are formed from the start of the polymerization remain very small (see Gilbert, Emulsion Polymerization, A Mechanistic Approach, Academic Press, London, San Diego, 1995, pp.12–14). The coemulsifiers used are usually long-chain alkanes, such as hexadecane or long-chain alcohols, such as hexadecanol (cetyl alcohol) or dodecanol.

In the case of suspension polymerization and its variants (microsuspension, minisuspension), the monomers are suspended in water, for which purpose protective colloids or emulsifiers are co-used.

Suitable protective colloids are cellulose derivatives, such as carboxymethylcellulose and hydroxymethylcellulose, poly-N-vinylpyrrolidone, polyvinyl alcohol and polyethylene oxide, anionic polymers, such as polyacrylic acid and copolymers thereof, and cationic polymers, such as poly-N-vinylimidazole. The amount of these protective colloids is preferably 0.1 to 5% by weight, based on the total mass of the emulsion. Protective colloids and processes for the preparation of protective colloids are known per se and are described, for example, in Encyclopedia of Polymer Science and Engineering, Vol. 16, p. 488, Verlag John Wiley, 1989.

Preference is given to using one or more polyvinyl alcohols as protective colloid, in particular those with a degree of hydrolysis below 96 mol%, particularly preferably 60 to 94 mol% and very particularly preferably 65 to 92 mol%. The preferred polyvinyl alcohols have a viscosity of from 2 to 100 mPa/s, in particular from 4 to 60 mPa/s, measured as a 4% strength by weight solution in water at 20° C. in accordance with DIN 53015.

In addition to the protective colloids, colloidal silica can be co-used in concentrations of generally 0.2 to 5% by weight, based on the amount of dispersion. Further details regarding this method, which is particularly successful with a water-soluble polymer of adipic acid and diethanolamine, are given in U.S. Pat. No. 3,615,972.

For suspension polymerization, preference is given to initiators with a half-lifetime of one hour if the temperature is 40 to 150° C., and which are noticeably soluble in monomers, but sparingly soluble in water.

Organic peroxides, organic hydroperoxides, azo compounds and/or compounds with C—C single bonds are therefore used as initiators RI. Also used as free-radical polymerization initiators are monomers which polymerize spontaneously at elevated temperature. It is also possible to use mixtures of said initiators RI. In the case of the peroxides, preference is given to those with hydrophobic properties, in particular those molecules with a carbon to oxygen atomic ratio greater than 3:1. Very particular preference is given to dilauroyl peroxide and dibenzoyl peroxide.

Preferred azo compounds are 2,2'-azobisisobutyronitrile and 2,2'-azobis-2-methylbutyronitrile. As compounds with labile C—C bonds, preference is given to using 3,4-dimethyl-3,4-diphenylhexane and 2,3-dimethyl-2,3-diphenylbutane.

Depending on the aggregate state of the initiator for suspension polymerization and its solubility behavior, it can be added as it is, but is preferably added in the form of a solution, emulsion (liquid in liquid) or suspension (solid in liquid), which allows in particular small amounts of initiator to be metered in precisely.

It is also possible to dissolve the initiator for suspension polymerization in the solvent or in the monomer and to disperse the resulting solution in water.

The suspension polymerization reaction is generally carried out with slow or moderate stirring.

Microsuspension polymerization differs from normal suspension polymerization primarily inasmuch as a finely divided suspension is prepared by the action of high shear forces. Details have already been described in connection with microemulsion polymerization.

Minisuspension polymerization differs from normal suspension polymerization and from microsuspension polymerization primarily inasmuch as the particle sizes are generally between those of suspension polymerization and microsuspension polymerization.

In precipitation polymerization, the monomers used are soluble in the continuous phase (e.g. solvent or solvent mixture), but the resulting polymers are insoluble or only soluble to a limited degree and therefore precipitate out during the polymerization. Bulk polymerizations in which the resulting polymer is insoluble in the monomer and therefore precipitates out are also possible. Depending on the reaction medium, the initiators described for emulsion polymerization or suspension polymerization are possible. It can also be initiated by thermal means.

In bulk polymerization, the monomers are polymerized without the addition of a reaction medium using said monomer-soluble initiators, i.e. the monomers are the reaction medium. It can also be initiated by thermal means.

Solution polymerization differs from bulk polymerization primarily inasmuch as water or an organic solvent, such as cyclohexane, ethylbenzene or dimethyl sulfoxide, is used to dilute the monomers.

Suitable polymerization initiators for free-radical solution polymerization are, for example, azo compounds, such as 2,2'-azobisisobutyronitrile, 2,2'-azobis-2-methylbutyronitrile, diacyl peroxides, such as dibenzoyl peroxide, dilauroyl peroxide, dodecanoyl peroxide and diisononanoyl peroxide, alkyl peresters, such as tert-butyl perpivalate, tert-butyl per-2-ethylhexanoate, tert-butyl permaleate, tert-butyl perisononanoate, tert-butyl perneodecanoate and tert-butyl perbenzoate, dialkyl peroxides, such as dicumyl peroxide and di-tert-butyl peroxide, peroxydicarbonates, such as dimyristyl peroxydicarbonate, dicetyl peroxydicarbonate, bis(4-tert-butylcyclohexyl) peroxydicarbonate, dicyclohexyl peroxydicarbonate, bis(2-ethylhexyl) peroxydicarbonate, hydroperoxides, such as tert-butylhydroperoxide, cumene hydroperoxide on its own or in mixtures of varying composition.

The process according to the invention can also be carried out as a combined process in which at least two of the polymerization processes described above are combined. In this connection, mention may be made in particular of bulk/solution, solution/precipitation, bulk/suspension and bulk/emulsion, starting with the first-mentioned in each case and ending with the last-mentioned.

The amount of initiator in free-radical polymerization reactions is preferably $10^{-6}$ to 5 mol/l, in particular $10^{-4}$ to $10^{-1}$ mol/l, based on the monomers. The exact amount is governed, in a known manner, by the desired molecular weight of the polymer. These quantitative amounts naturally do not refer to the case where a monomer is also initiator and initiation is by thermal means, as is possible, for example, in the case of styrene.

The method by which the initiator is added to the polymerization vessel over the course of the free-radical polymerization is known to the average person skilled in the art. It can be introduced either entirely into the polymerization vessel or at a rate at which it is consumed over the course of the free-radical polymerization continuously or stepwise. Specifically, this depends on the chemical nature of the initiator system and also on the polymerization temperature. Preference is given to initially introducing a small part and introducing the remainder to the polymerization zone at a rate at which it is consumed. It is often favorable if the polymerization reaction is carried out such that firstly $\leq 50\%$ by weight, often $\leq 45\%$ by weight or $\leq 40\%$ by weight, of the initiator are introduced continuously over a relatively long period of time and then subsequently $\geq 50\%$ by weight, often $\geq 55\%$ by weight or $\geq 60\%$ by weight, of the initiator are introduced into the polymerization vessel continuously over a relatively short period of time.

The polymerization temperature naturally depends on the decomposition characteristics of the polymerization initiator and is preferably at least 60° C., in particular at least 70° C., particularly preferably at least 80° C. and very particularly preferably at least 90 ° C. Usually, a polymerization temperature of 120° C. and preferably of 110° C. will not be exceeded in order to avoid complex pressurized apparatuses. However, suitable choice of the reaction vessel also permits temperatures above this to be used. In the so-called cold procedure, i.e. in the case of the use of redox initiator systems, it is also possible to carry out the polymerization at low temperatures, for example from 10° C.

The free-radical polymerization can be carried out in a manner customary per se in a polymerization apparatus which is generally provided with a stirrer, a number of feed vessels or feed lines, reflex condenser, and heating or cooling devices and is suitable for working under an inert-gas atmosphere and pressures above or below atmospheric pressure.

Characteristics of polymers are, inter alia, the glass transition temperature $T_g$, the average particle size as $d_{50}$ value, and the K value.

The glass transition temperature $T_g$ is the limiting value of the glass transition temperature which, according to G. Kanig (Kolloid-Zeitschrift & Zeitschrift fur Polymere, Vol. 190, page 1, equation 1), said temperature approaches as the molecular weight increases. The glass transition temperature is determined by the DSC process (Differential Scanning Calorimetry, 20 K/min, midpoint measurement, DIN 53765).

According to Fox (T. G. Fox, Bull. Am. Phys. Soc. 1956 [Ser. II] 1, page 123 and according to Ullmann's Encyclopedia of Industrial Chemistry, Vol. 19, page 18, 4th edition, Verlag Chemie, Weinheim, 1980), the following is a close approximation for the glass transition temperature of at most weakly crosslinked copolymers:

$$1/T_g = x^1/T_g^1 + x^2/T_g^2 + \ldots X^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers constructed in each case only from one of the monomers 1, 2, ... n in degrees Kelvin. The $T_g$ values for the homopolymers of most monomers are known and listed, for example, in Ullmann's Encyclopedia of Industrial Chemistry, Vol. 5, Vol. A21, page 169, VCH Weinheim, 1992. Further sources of glass transition temperatures of homopolymers are, for example, J. Brandrup, E.

H. Immergut, Polymer Handbook, 1$^{st}$ Ed., J. Wiley, New York, 1966, 2$^{nd}$ Ed., J. Wiley, New York, 1975, and 3$^{rd}$ Ed., J. Wiley, New York, 1989.

The average particle sizes given are the parameters determined from the integral mass distribution. The average particle sizes are in all cases the weight-average particle sizes, as have been determined by means of an analytical ultracentrifuge corresponding to the method by W. Scholtan and H. Lange, Koloid-Zeitschrift & Zeitschrift fur Polymere 1972, Vol. 250, pages 782–796. The ultracentrifuge measurement gives the integral mass distribution of the particle diameter of a sample. From this it can be deduced what percentage by weight of the particles have a diameter which is less than or equal to a certain value. The average particle diameter, which is also referred to as $d_{50}$ value of the integral mass distribution, is defined here as the particle diameter at which 50% by weight of the particles have a smaller diameter than the diameter which corresponds to the $d_{50}$ value. Likewise, 50% by weight of the particles then have a larger diameter than the $d_{50}$ value.

A further important feature of polymer compositions are the viscosity-based K values, as have been described by H. Fikentscher in Cellulosechemie 1932, 13, pages 58–64 and 71–74.

The examples below are intended to illustrate the invention, but not limit it.

The average particle diameter of the polymer was determined by quasi-electrical light scattering in accordance with ISO 13321 using a Malvern Autosizer 2C on 0.01% strength by weight samples. The light transmission was determined on 0.01% strength by weight samples for a path length of 2.5 cm against pure water as reference. The glass transition temperature was determined by means of DSC by the mid-point method. The residual volatile fractions were determined by gas chromatographic analysis. The K values were determined in accordance with H. Fikentscher (see above) and were measured using N-vinylpyrrolidone in 1% strength by weight aqueous solutions and using acrylates in 1% strength by weight ethanolic solutions at 25° C. in each case. The molar masses were determined by gel permeation chromatography in tetrahydrofuran as number-average. The calibration standard used was polystyrene.

EXAMPLE 1

Emulsion polymerization of a styrene-butadiene-acrylic acid polymer 300 g of water, 62 g of a 33% strength by weight polymer seed (polystyrene latex, $d_{50}$ 30 nm) and 10% of the initiator solution (feed 2) were initially introduced into a polymerization vessel and heated to 95° C.

Then, via two separate feeds, the monomer emulsion (feed 1) and the residual amount of the initiator solution were introduced into the polymerization vessel starting at the same time over the course of 2.5 h and with retention of the temperature. When the monomer addition was complete, the mixture was cooled to 70° C., then an aqueous solution of 4 g of tert-butyl hydro-peroxide in 40 g of water, and a solution of 1.7 g of acetone and 2.8 g of sodium disulfite in 38 g of water were introduced over the course of 2 h starting at the same time and with retention of the temperature. 22 g of a 25% strength by weight aqueous sodium hydroxide solution were then added and the mixture was cooled to room temperature.

| Feed 1: |
|---|
| 400 g of deionized water |
| 33 g of emulsifier solution |
| 0.8 g of 1-benzyl-2,5-cyclohexadiene-1-carboxylic acid |
| 675 g of styrene |
| 310 g of butadiene |
| 30 g of acrylic acid |
| 10 g of 25% strength by weight aqueous sodium hydroxide solution |

| Feed 2: |
|---|
| 10.2 g of sodium peroxodisulfate in 200 g of water |

Emulsifier solution: Mixture of 3 parts by weight of an aqueous, 45% strength by weight solution of the sodium salt of disulfonated monododecyl diphenyl ether (DOWFAX® 2A1, Dow Chemical) and 7 parts by weight of an aqueous 15% strength by weight sodium dodecylbenzenesulfonate solution.

The solids content of the dispersion was about 50% by weight. The light transmission was 70%. The weight-average particle size was 124 nm. The pH was 6.8, and the glass transition temperature was 27° C. The gel content following extraction with THF was 85%.

COMPARATIVE EXAMPLE 1

300 g of water, 62 g of a 33% strength by weight polymer seed (polystyrene latex, $d_{50}$ 30 nm) and 10% of the initiator solution (feed 2) were initially introduced into a polymerization vessel and heated to 95° C.

Then, via two separate feeds, the monomer emulsion (feed 1) and the remainder of the initiator solution were introduced into the polymerization vessel starting at the same time over the course of 2.5 h and with retention of the temperature. When the monomer addition was complete, the mixture was cooled to 70° C., and then an aqueous solution of 4 g of tert-butyl hydroperoxide in 40 g of water, and a solution of 1.7 g of acetone and 2.8 g of sodium disulfite in 38 g of water were added over the course of 2 h starting at the same time and with retention of the temperature. 22 g of a 25% strength by weight aqueous sodium hydroxide solution were then added and the mixture was cooled to room temperature.

| Feed 1: |
|---|
| 400 g of deionized water |
| 33 g of emulsifier solution (see Example 1) |
| 675 g of styrene |
| 310 g of butadiene |
| 30 g of acrylic acid |
| 10 g of 25% strength by weight aqueous sodium hydroxide solution |

| Feed 2: |
|---|
| 10.2 g of sodium peroxodisulfate in 200 g of water |

The solids content of the dispersion was about 50% by weight. The light transmission was 69%. The weight-average particle size was 126 nm. The pH was 6.7, and the glass transition temperature was 27° C. The gel content following extraction with THF was 93%.

EXAMPLE 2

Bulk Polymerization of Styrene

A round-bottomed flask was charged with 148.5 g of styrene and flushed with nitrogen. The reaction mixture was heated to 80° C., then 0.068 g of Porofor® N (Akzo) and 0.25 g of methyl 1-methyl-2,5-cyclohexadiene-1-carboxylate were added. The solution was stirred for two hours at 80° C. and then cooled to room temperature.

The solids content was 30% by weight. The number-average molecular weight was 127 000 g/mol.

COMPARATIVE EXAMPLE 2

A round-bottomed flask was charged with 148.5 g of styrene and flushed with nitrogen. The reaction mixture was heated to 80° C., then 0.068 g of Porofor® N (Akzo) was added. The solution was stirred for two hours at 80° C. and then cooled to room temperature.

The solids content was 29% by weight. The number-average molecular weight was 155 500 g/mol.

EXAMPLE 3

Emulsion polymerization of an ethyl acrylate-methacrylic acid polymer 372 g of water, 1 g of sodium lauryl sulfate and 35 g of the monomer solution (feed 1) were initially introduced and heated to 80° C. At 40° C., 8 g of a 7% by weight aqueous solution of sodium persulfate were added. After the polymerization temperature had been reached, the remainder of the monomer solution was added over the course of 2 h and then the mixture was after-polymerized for 1 h.

Feed 1:

200 g of completely deionized water
15 g of 15% strength by weight aqueous solution of sodium lauryl sulfate
280 g of ethyl acrylate
70 g of methacrylic acid
0.37 g of methyl 1-methyl-2,5-cyclohexadiene-1-carboxylate The solids content of the dispersion was about 38%. The particle size was 142 nm. The K value of the polymer measured in ethanol was 54.

COMPARATIVE EXAMPLE 3

372 g of water, 1 g of sodium lauryl sulfate and 35 g of the monomer solution (feed 1) were initially introduced and heated to 80° C. At 40° C., 8 g of a 7% by weight aqueous solution of sodium persulfate were added. After the polymerization temperature had been reached, the remainder of the monomer solution was added over the course of 2 h and then the mixture was after-polymerized for 1 h.

Feed 1:

200 g of completely deionized water
15 g of 15% strength by weight aqueous solution of sodium lauryl sulfate
280 g of ethyl acrylate
70 g of methacrylic acid The solids content of the dispersion was about 38%. The particle size was 145 nm. The K value of the polymer measured in ethanol was 89.

EXAMPLE 4

Solution polymerization of N-vinylpyrrolidone

The solutions from feed 1 and feed 2 were added to an initial charge of 50 g of water at 75° C. starting at the same time over the course of 2 h. The mixture was then after-polymerized for 1 h.

Feed 1:

50 g of N-vinylpyrrolidone
150 g of completely deionized water
0.43 g of 1-isopropyl-2,5-cyclohexadiene-1-carboxylic acid Feed 2:

0.15 g of Wako ® V-50
83 g of completely deionized water

The solids content of the solution was 16%. The K value of the polymer measured in ethanol was 61.

COMPARATIVE EXAMPLE 4

The solutions from feed 1 and feed 2 were added to an initial charge of 50 g of water at 75° C. starting at the same time over the course of 2 h. The mixture was then after-polymerized for 1 h.

Feed 1:

50 g of N-vinylpyrrolidone
150 g of completely deionized water

Feed 2:

0.15 g of Wako ® V-50
83 g of completely deionized water

The solids content of the solution was 15%. The K value of the polymer measured in ethanol was 67.

I claim:

1. A process for free-radical polymerization in the presence of a regulator, wherein said regulator comprises, a carbocyclic or heterocyclic compound which comprises a leaving group in the allyl or heteroallyl position, or homoallyl or homoheteroallyl position, respectively, wherein said carbocyclic or heterocyclic compound, following free-radical hydrogen abstraction, forms an aromatic system with elimination of a free-radical leaving group.

2. The process as claimed in claim 1, wherein said aromatic system is an optionally substituted phenyl, pyridine, pyridazine, pyrimidine, pyrazine, pyran, thiopyran, pyrrole, pyrazole, imidazole, furan, oxazole, isoxazole, thiophene, thiazol or isothiazol.

3. The process as claimed in claim 1, wherein the leaving group is a carboxylate, silyl, sulfonyl, aryl, benzyl, allyl or alkyl group.

4. The process as claimed in claim 1, wherein the regulator is at least one compound from the formulae (I), (II), (III) or (IV)

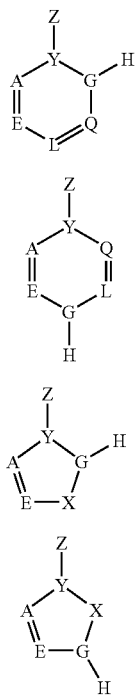

in which
- A is C—R¹, N,
- E is C—R², N,
- L is C—R³, N,
- Q is C—R⁴, N, where

R¹–R⁴ independently of one another are hydrogen, $C_1$–$C_{10}$-alkyl, $C_1$–$C_{10}$-alkoxy, $C_1$–$C_{10}$-alkylamino, $C_2$–$C_{20}$-dialkylamino, $C_1$–$C_{10}$-alkylcarbonyl, $C_1$–$C_{10}$-alkylsulfonyl, $C_2$–$C_{10}$-alkenyl, $C_2$–$C_{10}$-alkynyl, in which at least two of the radicals R¹–R⁴ may be joined together to give a 3- to 8-membered ring, G is C—R⁵, N, where R⁵ is hydrogen, $C_1$–$C_{10}$-alkyl, X is O, N—R⁶, S, where R⁶ is hydrogen, $C_1$–$C_{10}$-alkoxy, $C_1$–$C_{10}$-alkylamino, $C_2$–$C_{20}$-dialkylamino, $C_1$–$C_{10}$-alkylcarbonyl, $C_1$–$C_{10}$-alkylsulfonyl, Y is C—R⁷, N, where R⁷ is hydrogen, carboxyl, $C_1$–$C_{10}$-alkyl, $C_1$–$C_{10}$-alkoxy, $C_1$–$C_{10}$-alkylcarbonyl, $C_1$–$C_{10}$-alkoxycarbonyl, $C_1$–$C_{10}$-alkylaminocarbonyl, $C_2$–$C_{20}$-dialkylaminocarbonyl, $C_1$–$C_{10}$-alkylcarbonyloxy, $C_1$–$C_{10}$-alkylcarbonylamino, $C_1$–$C_{10}$-alkylsulfonyl, $C_1$–$C_{10}$-alkoxysulfonyl, $C_1$–$C_{10}$-alkylaminosulfonyl, $C_2$–$C_{20}$-dialkylaminosulfonyl, $C_1$–$C_{10}$-acyl, $C_2$–$C_{10}$-alkenyl, $C_3$–$C_{10}$-alkenyloxy, $C_2$–$C_{10}$-alkenylcarbonyl, $C_3$–$C_{10}$-alkenyloxycarbonyl, $C_3$–$C_{10}$-alkenylaminocarbonyl, $C_2$–$C_{10}$-alkenylcarbonyloxy, $C_2$–$C_{10}$-alkenylcarbonylamino, $C_2$–$C_{10}$-alkenylsulfonyl, $C_3$–$C_{10}$-alkenyloxysulfonyl, $C_3$–$C_{10}$-alkenylaminosulfonyl, $C_2$–$C_{10}$-alkynyl, $C_3$–$C_{10}$-alkynyloxy, $C_2$–$C_{10}$-alkynylcarbonyl, $C_3$–$C_{10}$-alkynyloxycarbonyl, $C_3$–$C_{10}$-alkynylaminocarbonyl, $C_2$–$C_{10}$-alkynylcarbonyloxy, $C_2$–$C_{10}$-alkynylcarbonylamino, $C_2$–$C_{10}$-alkynylsulfonyl, $C_3$–$C_{10}$-alkynyloxysulfonyl, $C_3$–$C_{10}$-alkynylaminosulfonyl, $C_3$–$C_{12}$-cycloalkyl, $C_3$–$C_{12}$-cycloalkoxy, $C_3$–$C_{12}$-cycloalkylcarbonyl, $C_3$–$C_{12}$-cycloalkoxycarbonyl, $C_3$–$C_{12}$-cycloalkylaminocarbonyl, $C_3$–$C_{12}$-cycloalkylcarbonyloxy, $C_3$–$C_{12}$-cycloalkylcarbonylamino, $C_3$–$C_{12}$-cycloalkylsulfonyl, $C_3$–$C_{12}$-cycloalkoxysulfonyl, $C_3$–$C_{12}$-cycloalkylaminosulfonyl, aryl, aryloxy, arylcarbonyl, aryloxycarbonyl, arylaminocarbonyl, arylcarbonyloxy, arylcarbonylamino, arylsulfonyl, aryloxysulfonyl, arylaminosulfonyl, Z is COOR⁸, SiR⁹R¹⁰R¹¹, SO₂R¹², aryl, optionally substituted benzyl, $C_3$–$C_{10}$-2-alken-1-yl, R¹³ where

R⁸, R³ are $C_1$–$C_{10}$-alkyl,

R⁹–R¹¹ independently of one another are hydrogen, $C_1$–$C_{10}$-alkyl, in which two of the radicals R⁹–R¹¹ may be joined together to give a 3- to 8-membered ring, R¹² is hydrogen, $C_1$–$C_{10}$-alkyl, with the proviso that a maximum of 2 heteroatoms are in the ring of the heterocyclic compound.

5. The process as claimed in claim 1, wherein the regulator is cyclohexadienecarboxylic acid optionally substituted by $C_1$–$C_4$-alkyl radicals as R⁷, methyl cyclohexadienecarboxylate, ethyl cyclohexadienecarboxylate, dihydrofurancarboxylic acid, methyl dihydrofurancarboxylate and/or ethyl dihydrofurancarboxylate or mixtureof.

6. The process as claimed in claim 1, wherein the regulator is methyl 1-methyl-2,5-cyclohexadiene-1-carboxylate, 1-isopropyl-2,5-cyclohexadiene-1-carboxylic acid, 1-tert-butyl-2,5-cyclohexadiene-1-carboxylic acid, 1-benzyl-2,5-cyclohexadiene-1-carboxylic acid, 1-allyl-2,5-cyclohexadiene-1-carboxylic acid and/or 1-cyanomethyl-2,5-cyclohexadiene-1-carboxylic acid.

7. The process as claimed in claim 1, wherein 0.01 to 5% by weight of regulator, based on the total amount of monomers, is used.

8. The process as claimed in claim 1, wherein the regulator is utilized in emulsion, micro emulsion, miniemulsion, suspension, microsuspension, minisuspension, precipitation, bulk and/or in solution polymerizations.

9. The process as claimed in claim 1, wherein homopolymers and/or copolymers are prepared.

10. The process as claimed in claim 9, wherein the homopolymers and/or copolymers are prepared from monomers comprising monoethylenically unsaturated $C_3$–$C_6$-carboxylic acids, $C_1$–$C_{20}$-(meth)acrylic esters, amides and nitriles, vinyl esters of carboxylic acids containing up to 20 carbon atoms, vinylaromatics having up to 20 carbon atoms, vinyl halides, vinyl ethers of alcohols containing 1 to 10 carbon atoms, aliphatic optionally halogenated hydrocarbons having 2 to 8 carbon atoms and 1 or 2 double bonds, open-chain N-vinylamide compounds, vinylidenes or mixtures of these monomers.

11. A method for regulating a free-radical polymerization reaction comprising utilizing the compounds of formulae (I), (II), (III) or (IV) as polymerization reaction regulators.

* * * * *